(12) United States Patent
Lipcsei

(10) Patent No.: US 11,742,767 B2
(45) Date of Patent: Aug. 29, 2023

(54) FLUX-CORRECTED SWITCHING POWER CONVERTERS

(71) Applicant: Maxim Integrated Products, Inc., San Jose, CA (US)

(72) Inventor: Laszlo Lipcsei, Campbell, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 131 days.

(21) Appl. No.: 17/360,052

(22) Filed: Jun. 28, 2021

(65) Prior Publication Data

US 2021/0408925 A1 Dec. 30, 2021

Related U.S. Application Data

(60) Provisional application No. 63/044,901, filed on Jun. 26, 2020.

(51) Int. Cl.
*H02M 3/335* (2006.01)
*H01F 27/38* (2006.01)
*H02M 1/00* (2006.01)

(52) U.S. Cl.
CPC ........ *H02M 3/33576* (2013.01); *H01F 27/38* (2013.01); *H02M 1/0064* (2021.05); *H02M 3/33507* (2013.01); *H02M 3/33592* (2013.01)

(58) Field of Classification Search
CPC ......... H02M 3/33507; H02M 3/33576; H02M 3/33592
See application file for complete search history.

(56) References Cited

U.S. PATENT DOCUMENTS

| | | | | |
|---|---|---|---|---|
| 5,206,800 A | * | 4/1993 | Smith | H02M 3/33576 363/21.14 |
| 5,331,533 A | * | 7/1994 | Smith | H02M 3/33576 363/20 |
| RE38,196 E | | 7/2003 | Vinciarelli et al. | |
| 7,813,148 B2 | | 10/2010 | Zeng et al. | |
| 9,584,036 B2 | * | 2/2017 | Garrity | H02M 7/44 |
| 10,284,099 B2 | * | 5/2019 | Zhang | H02M 1/08 |
| 10,297,379 B2 | * | 5/2019 | Gold | H01F 38/08 |
| 2012/0257421 A1 | * | 10/2012 | Brkovic | H02M 3/33592 363/21.07 |
| 2016/0301314 A1 | * | 10/2016 | Polivka | H02M 3/33507 |

OTHER PUBLICATIONS

"Fast multi-phase trans-inductor voltage regulator", Technical Disclosure Commons, Defensive Publication Series, May 9, 2019, 15 pages.

* cited by examiner

*Primary Examiner* — Gary A Nash
(74) *Attorney, Agent, or Firm* — Cozen O'Connor

(57) ABSTRACT

A flux-corrected switching power converter includes a first transformer, a first switching stage, a controller, and a flux correction current source. The first transformer includes a first magnetic core, a first primary winding, and a first secondary winding, and the first switching stage is electrically coupled to the first secondary winding. The controller is configured to control switching of at least the first switching stage. The flux correction current source is electrically coupled to the first primary winding, and the flux correction current source is configured to inject current into the first primary winding to at least partially cancel magnetic flux in the first magnetic core that is generated by current flowing through the first secondary winding.

19 Claims, 13 Drawing Sheets

FLUX-CORRECTED SWITCHING POWER CONVERTERS

CROSS-REFERENCE TO RELATED APPLICATIONS

This application claims benefit of priority to U.S. Provisional Patent Application Ser. No. 63/044,901, filed Jun. 26, 2020, which is incorporated herein by reference in its entirety.

BACKGROUND

Switching power converters are widely used in electronic devices, such as to provide a regulated electrical power source. A switching power converter is configured such that its solid-state power switching devices do not continuously operate in their active states; instead, the switching devices repeatedly switch between their on-states and off-states. Switching power converters include at least one energy storage device, such as an inductor or a capacitor. Although switching power converters can achieve high efficiency, particularly under heavy load conditions, their energy storage device(s) may cause them to respond slowly to a load change. For example, an output inductor in a buck switching power converter limits how quickly load current can change, thereby limiting the power converter's ability to quickly respond to a load change.

A switching power converter's ability to respond to a load change is referred to as the switching power converter's transient response. A switching power converter with a good transient response responds quickly to a load change, while a switching power converter with a poor transient response responds slowly to a load change. Good transient response is required in many applications, such as to help maintain voltage regulation during dynamic loading conditions.

DETAILED DESCRIPTION OF THE EMBODIMENTS

Figure 1:
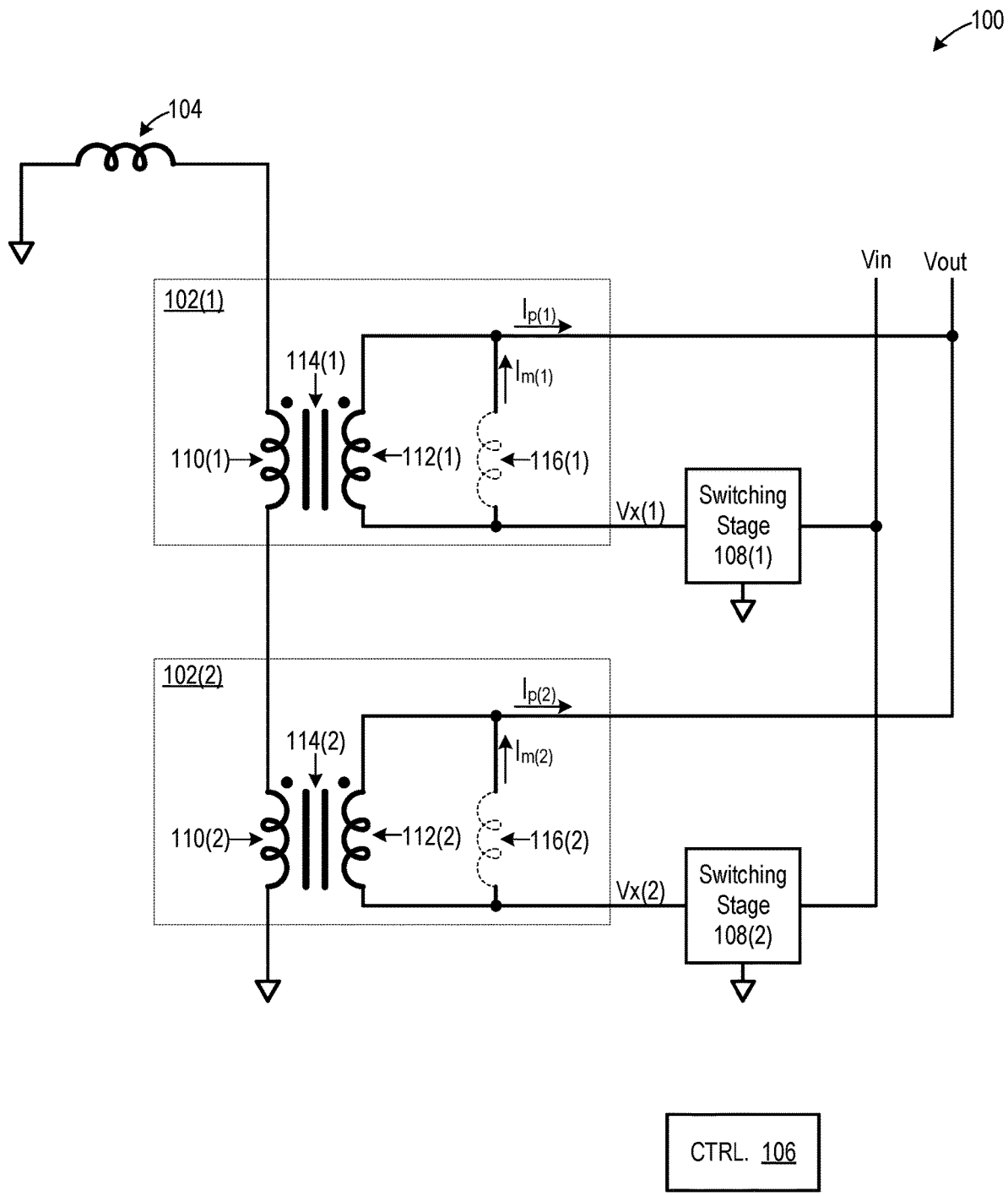
FIG. 1 is a schematic diagram of a switching power converter including transformers in place of discrete inductors.

A switching power converter's transient response can be improved by (a) replacing discrete inductors with transformers and (b) electrically coupling the transformer primary windings in series. For example, FIG. 1 is a schematic diagram of a switching power converter 100, which includes transformers 102 in place of discrete inductors. In this document, specific instances of an item may be referred to by use of a numeral in parentheses (e.g., transformer 102(1)) while numerals without parentheses refer to any such item (e.g., transformers 102). Switching power converter 100 further includes a tuning inductor 104, a controller 106, and a respective switching stage 108 for each transformer 102. Each transformer 102 includes a primary winding 110, a secondary winding 112, and a magnetic core 114, where the magnetic core is configured to magnetically couple primary winding 110 and secondary winding 112. Each transformer 102 exhibits magnetizing inductance and leakage inductance. Magnetizing inductance is modeled by an inductor 116 electrically coupled in parallel with secondary winding 112, although it should be understood that magnetizing inductance does not result from a discrete element but is instead an inherent transformer property. Leakage inductance is not shown in FIG. 1 for illustrative clarity.

Primary windings 110 are electrically coupled in series with tuning inductor 104. Each secondary winding 112 is electrically coupled between a respective switching node Vx and an output power node Vout. Each switching stage 108 is electrically coupled to a respective secondary winding 112 at its switching node Vx, and each switching stage 108 is also electrically coupled to an input power node Vin and ground. Controller 106 generates control signals (not shown) to control switching stages 108, such that each switching stage 108 repeatedly switches its respective switching node Vx between node Vin and ground. Controller 106 further generates the control signals such that switching stages 108 switch out of phase with respect to each other.

Figure 2:
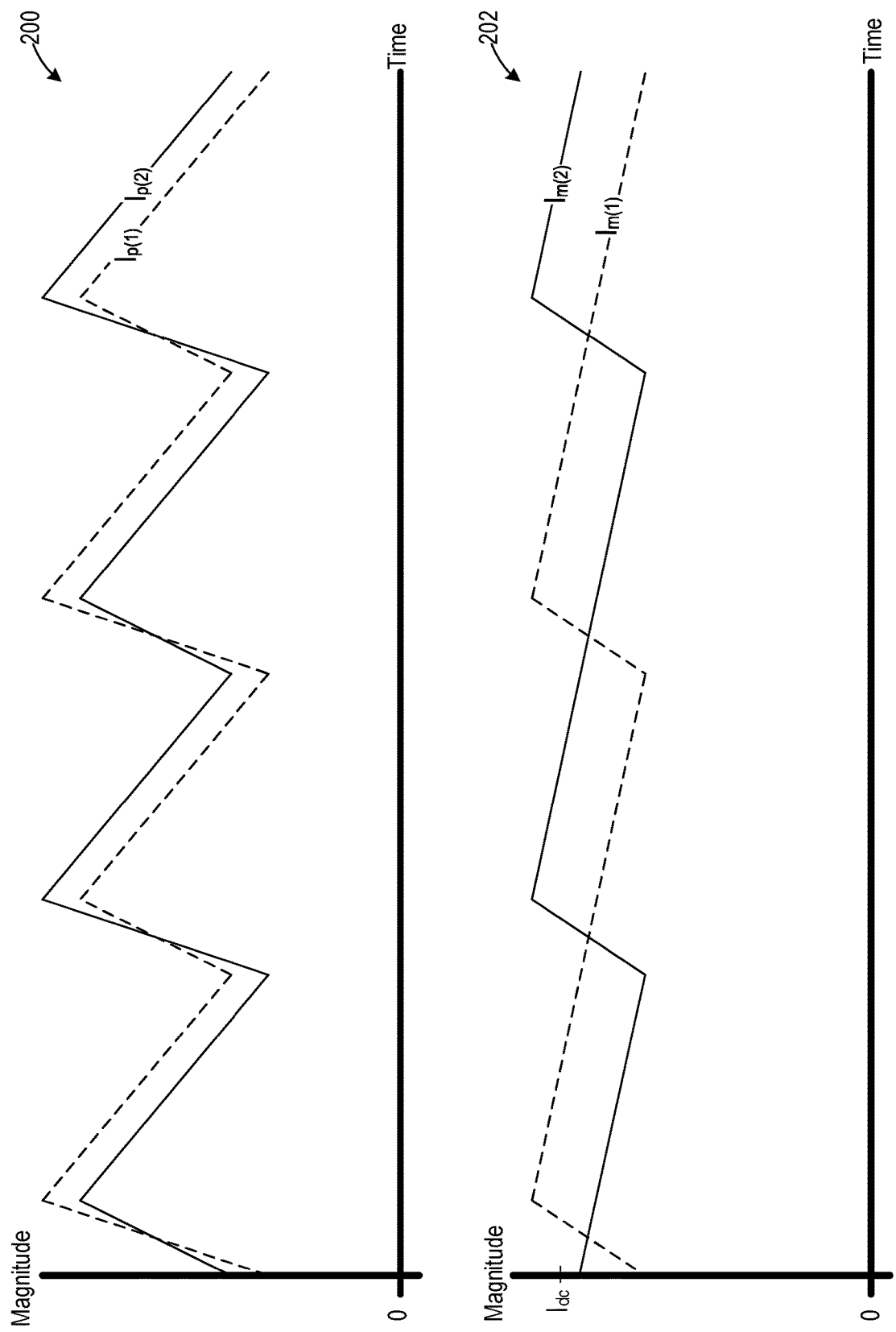
FIG. 2 includes two graphs illustrating an example of operation of the FIG. 1 switching power converter.

FIG. 2 includes graphs 200 and 202 illustrating one example of operation of switching power converter 200. The horizontal axes of graphs 200 and 202 represents time, and the vertical axes of graphs 200 and 202 represents magnitude. Graphs 200 and 202 have a common time base. Graph 200 includes curves representing phase currents $I_{p(1)}$ and $I_{p(2)}$ flowing out of the secondary sides of transformers 102(1) and 102(2), respectively, and graph 202 includes curves representing magnetizing current $I_{m(1)}$ and $I_{m(2)}$ of transformers 102(1) and 102(2), respectively.

Referring again to FIG. 1, use of transformers 102 in place of discrete inductors can achieve significant improvements in transient response. However, magnetic cores 114 must be capable of handling large values of magnetic flux, due to potentially large magnitude of direct current (DC) flowing through the secondary sides of transformers 102. For example, FIG. 2 illustrates respective magnetizing currents $I_{m(1)}$ and $I_{m(2)}$ of transformers 102(1) and 102(2) as having a large DC component Idc, which indicates that large values of magnetic flux flow through magnetic cores 114(1) and 114(2), respectively. Magnetic cores 114 therefore need to be large to handle the magnetic flux values without saturating. Large magnetic core 114 sizes are typically undesirable due to need to minimize size and cost of switching power converter 100.

Disclosed herein are flux-corrected switching power converters and associated methods which at least partially overcome the problems discussed above. These new switching power converters include a flux correction current source which injects current through transformer primary windings, to at least partially cancel magnetic flux generated by current flowing through transformer secondary windings. Therefore, net magnetic flux in transformer cores is relatively small, or even essentially zero in some embodiments, which enables the transformer cores to be significantly smaller while still avoiding magnetic saturation, thereby promoting small switching power converter size and cost.

Figure 3:
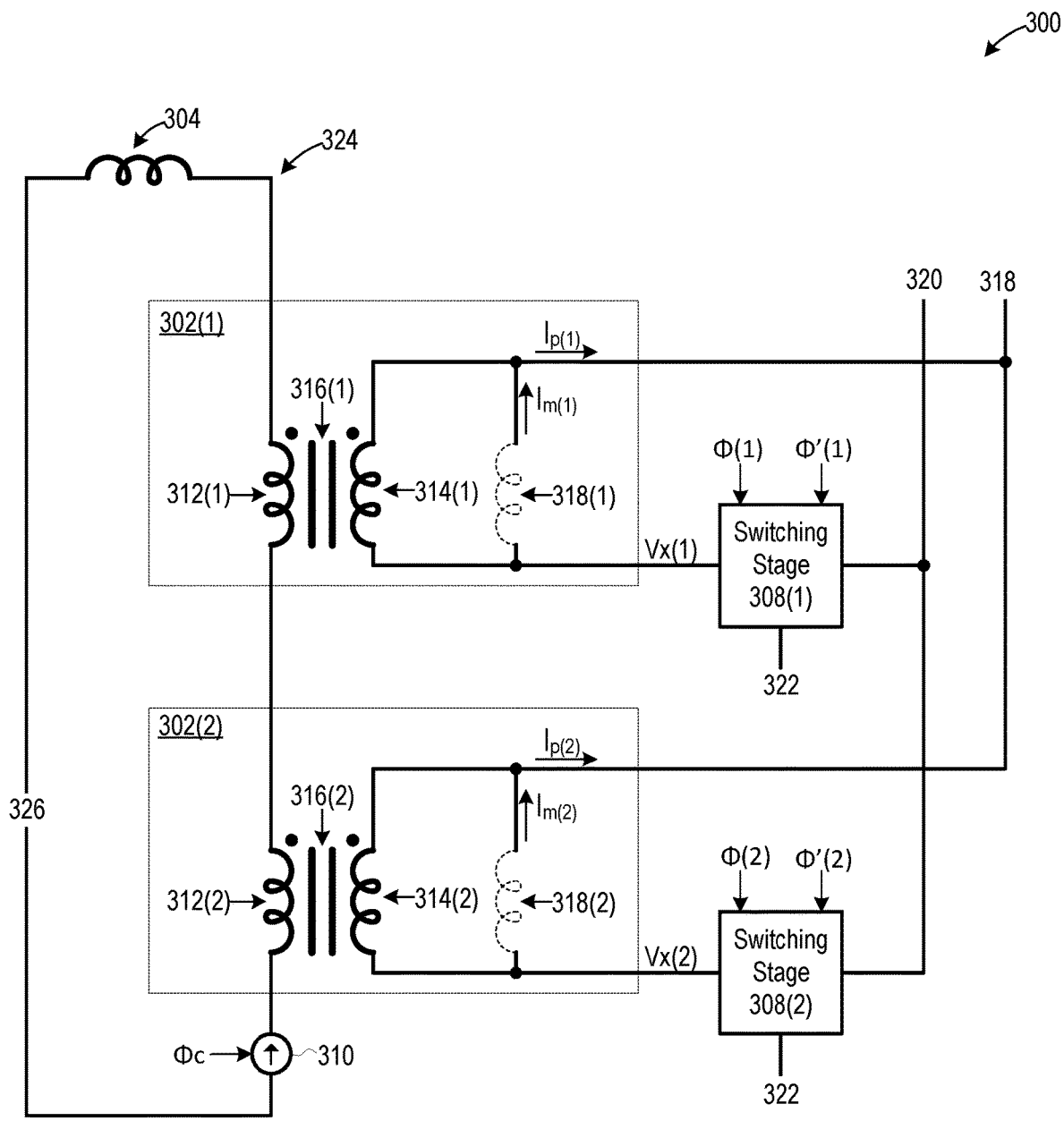
FIG. 3 is a schematic diagram of a flux-corrected switching power converter, according to an embodiment.

FIG. 3 is a schematic diagram of a switching power converter 300, which is one embodiment of the new flux-corrected switching power converters. Flux-corrected switching power converter 300 includes a plurality of transformers 302, a tuning inductor 304, a controller 306, a respective switching stage 308 for each transformer 302, and a flux correction current source 310. Each transformer 302 includes a primary winding 312, a secondary winding 314, and a magnetic core 316, where the magnetic core is configured to magnetically couple primary winding 312 and secondary winding 314. Each transformer 302 exhibits magnetizing inductance and leakage inductance. Magnetizing inductance is modeled by an inductor 318 electrically coupled in parallel with secondary winding 314, although it should be understood that magnetizing inductance does not result from a discrete element but is instead an inherent transformer property. Transformer leakage inductance is not shown in FIG. 3 for illustrative clarity.

A respective switching stage 308 is electrically coupled to the secondary winding 314 of each transformer 302 at a respective switching node Vx. Each secondary winding 314 is also electrically coupled to a power node 318. Accordingly, each secondary winding 314 is electrically coupled between power node 318 and a respective switching node Vx. Controller 306 is configured to generate a respective pair of control signals ϕ and ϕ' for each switching stage 308. Connections between controller 306 and switching stages 308 are not shown for illustrative clarity. Controller 306 is formed, for example, of analog electrical circuitry and/or digital electronic circuitry. Although controller 306 is illustrated as a discrete element, controller 306 could be incorporated with one or more other elements of switching power converter 300. Additionally, controller 306 could include multiple subsystems disposed at different locations without departing from the scope hereof.

Figure 4:
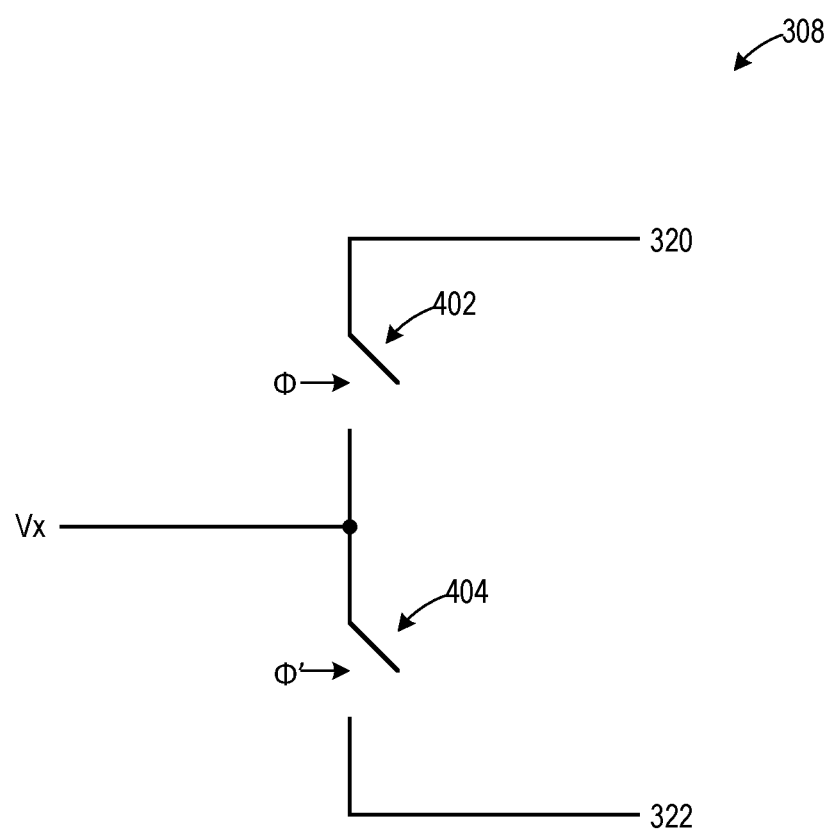
FIG. 4 is a schematic diagram of a switching stage of the FIG. 3 switching power converter.

Each switching stage 308 is electrically coupled to a power node 320 and a reference node 322, as well as to its respective switching node Vx. Each switching stage 308 is configured to repeatedly switch its respective switching node Vx between power node 320 and reference node 322, in accordance with control signals ϕ and ϕ'. FIG. 4 is a schematic diagram of a switching stage 308 instance. Each switching stage 308 includes a first switching device 402 and a second switching device 404 electrically coupled in series across power node 320 and reference node 322. In each switching stage 308, first switching device 402 and second switching device 404 are joined at the respective switching node Vx of the switching stage. Each first switching device 402 is controlled by a respective control signal ϕ, and each second switching device 404 is controlled by a respective control signal ϕ'. In some embodiments, each first switching device 402 operates in its on-state when its respective control signal ϕ is asserted, and each first switching device 402 operates in its off-state when its respective control signal ϕ is de-asserted. Similarly, in some embodiments, each second switching device 404 operates in its on-state when its respective control signal ϕ' is asserted, and each second switching device 404 operates in its off-state when its respective control signal ϕ' is de-asserted. Each first switching device 402 and each second switching device 404 includes, for example, a transistor, such as a field effect transistor (FET) or a bipolar junction transistor (BJT). In some embodiments, first switching devices 402 or second switching devices 404 are replaced with respective diodes.

Referring again to FIG. 3, in some embodiments, power node 320 is an input power node and power node 318 is an output power node, such that switching power converter 300 has a buck topology. In some other embodiments, power node 320 is an output power node and power node 318 is an input power node, such that switching power converter 300 has a boost topology. However, switching power converter 300 could be modified to have other topologies without departing from the scope hereof. For example, in one alternate embodiment, reference node 322 is instead an input power node, power node 318 is instead a reference node, and power node 320 is an output power node, such that switching power converter 300 has a buck-boost topology.

Controller 306 is configured to generate control signals ϕ and ϕ' to control switching of switching stages 308 such that switching stages 308 switch out of phase with each other. For example, in some embodiments, controller 306 generates control signals ϕ and ϕ' to control switching stages 308 such that the switching stages 308 switch 180 degrees out of phase with each other. Additionally, as discussed further below, switching power converter 300 could be modified to include a different number of transformers 302 and respective switching stages 308, and in such alternate embodiments, controller 306 is optionally configured to generate control signals ϕ and ϕ' such that switching stages 308 switch with a different phase offset. For example, in an alternate embodiment including three transformers 302 and three respective switching stages 308, controller 306 is configured to generate control signals ϕ and ϕ' such that adjacent switching stages 308 are phase offset by 120 degrees. As another example, in an alternate embodiment including four transformers 302 and four respective switching stages 308, controller 306 is configured to generate control signals ϕ and ϕ' such that adjacent switching stages 308 are phase offset by 90 degrees. In some embodiments, controller 306 is configured to generate control signals ϕ and ϕ' such that adjacent switching stages 308 are phase offset by ϕ degrees, where ϕ is equal to 360/N, and N is number of phases in switching power converter 300. In this document, a "phase" refers to a switching stage and an associated magnetic device (transformer or inductor). For example, switching stage 308(1) and transformer 302(1) form a first phase, and switching stage 308(2) and transformer 302(2) form a second phase.

Controller 306 is configured to generate control signals ϕ and ϕ', for example, using pulse width modulation (PWM), pulse frequency modulation (PFM), or another modulation technique. In certain embodiments, controller 306 is configured to generate control signals ϕ and ϕ' such that they are complementary to each other, with optional deadtime between switching states where neither control signal is asserted. Additionally, in some embodiments, controller 306 is configured to generate control signals ϕ and ϕ' in a manner which regulates one or more parameters of switching power converter 300, such as voltage at one of nodes 318, 320, or 322, or current flowing into or out of one of these nodes.

Figure 5:
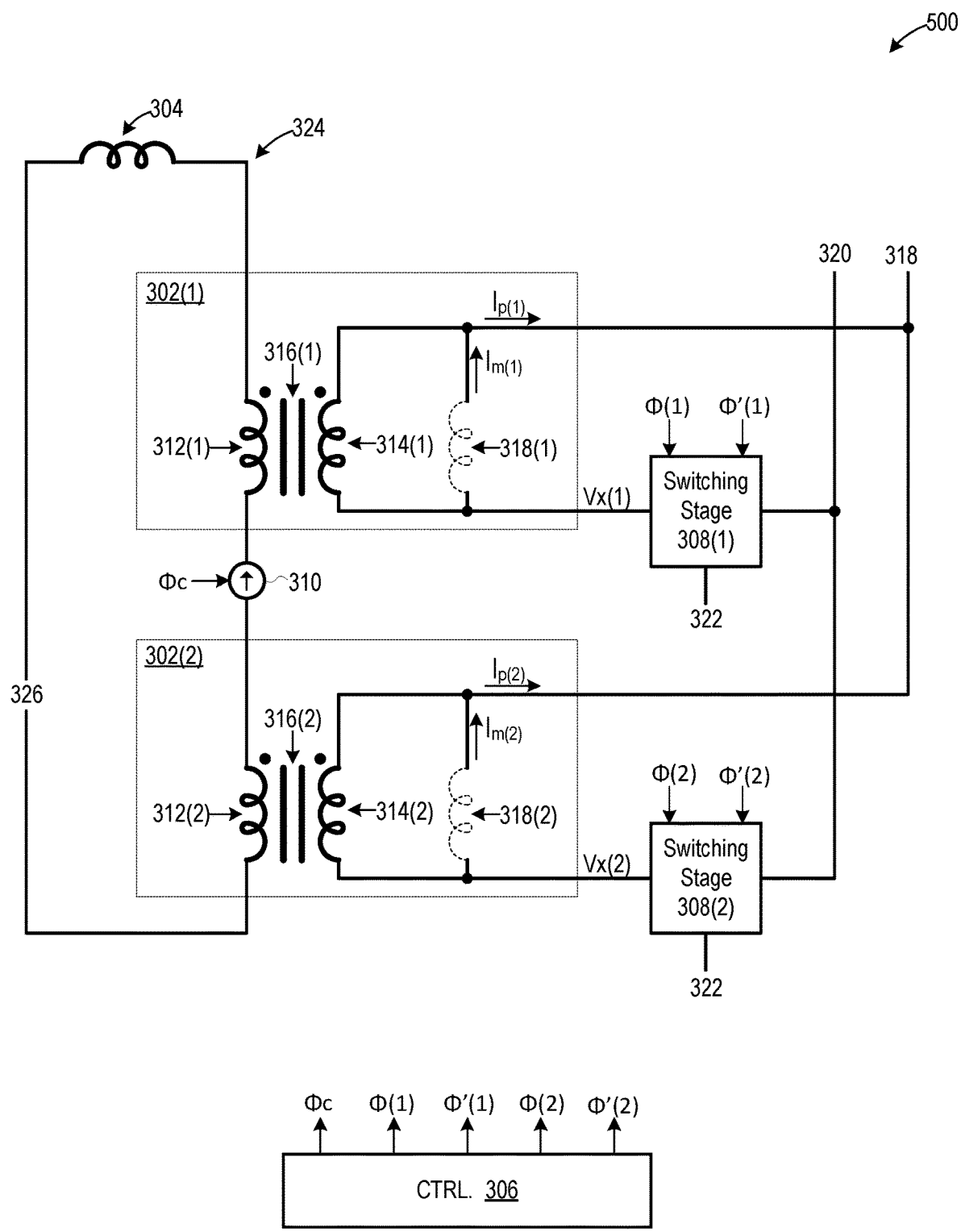
FIG. 5 is a schematic diagram of an alternate embodiment of the FIG. 3 flux-corrected switching power converter, according to an embodiment.

Primary windings 312, tuning inductor 304, and flux correction current source 310 are electrically coupled in series to form a circuit 324. A node 326 completing the series circuit need not be a dedicated node. For example, in some embodiments, node 326 is reference node 322, and a ground plane of reference node 322 connects tuning inductor 304 and flux correction current source 310. Additionally, tuning inductor 304 could be implemented by multiple inductors instead of by a single inductor, or tuning inductor 304 could be omitted if leakage inductance of transformers 302 is sufficiently large. Furthermore, the relative positions of elements in circuit 324 could vary. For example, FIG. 5 is a schematic diagram of a switching power converter 500, which is an alternate embodiment of switching power converter 300 where flux correction current source 310 is located in circuit 324 between transformers 302(1) and 302(2), instead of between transformer 303(2) and tuning inductor 304.

Referring again to FIG. 3, flux correction current source 310 is configured to inject current, such as DC, into primary windings 312 to at least partially cancel magnetic flux in magnetic cores 316 that is generated by current flowing through secondary windings 314. Consequently, magnitude of net magnetic flux in magnetic cores 316 is significantly lower than it would be if flux correction current source 310 were not present, thereby allowing size of magnetic cores 316 to be reduced without danger of magnetic saturation. Such reduction of magnetic core 316 size in turn reduces size and cost of transformers 302. Accordingly, inclusion of flux correction current source 310 in switching power converter 300 advantageously promotes small size and low cost of switching power converter 300.

Flux correction current source 310 is controlled by control signal $\phi c$ generated by controller 306. In some embodiments, such as discussed below with respect to FIG. 7, control signal $\phi c$ includes control signals $\phi$ and $\phi'$ for driving switching stages 308. In some other embodiments, controller 306 generates control signal $\phi c$ specifically for flux correction current source 310 in a manner which causes correction current source 310 to at least substantially cancel magnetic flux in magnetic cores 316. For example, in certain embodiments, controller 306 monitors magnetic flux in one or more transformer cores 316, and controller 306 includes a closed-loop control system that compares the monitored magnetic flux to a reference value to generate an error signal. Controller 306 then generates signal $\phi c$ in a manner which minimizes the error signal, thereby minimizing magnetic core 316 net magnetic flux. In some embodiments, controller 306 is configured to directly monitor magnetic flux in one or more transformer cores 316 using one or more magnetic flux sensors. In some other embodiments, controller 306 is configured to indirectly determine magnetic flux magnitude in one or more transformer cores 316 from one or more parameters related to magnetic flux magnitude, such as the product of winding voltage and time (volts-seconds), or magnitude of DC current flowing a through a transformer 302 winding.

Figure 6:
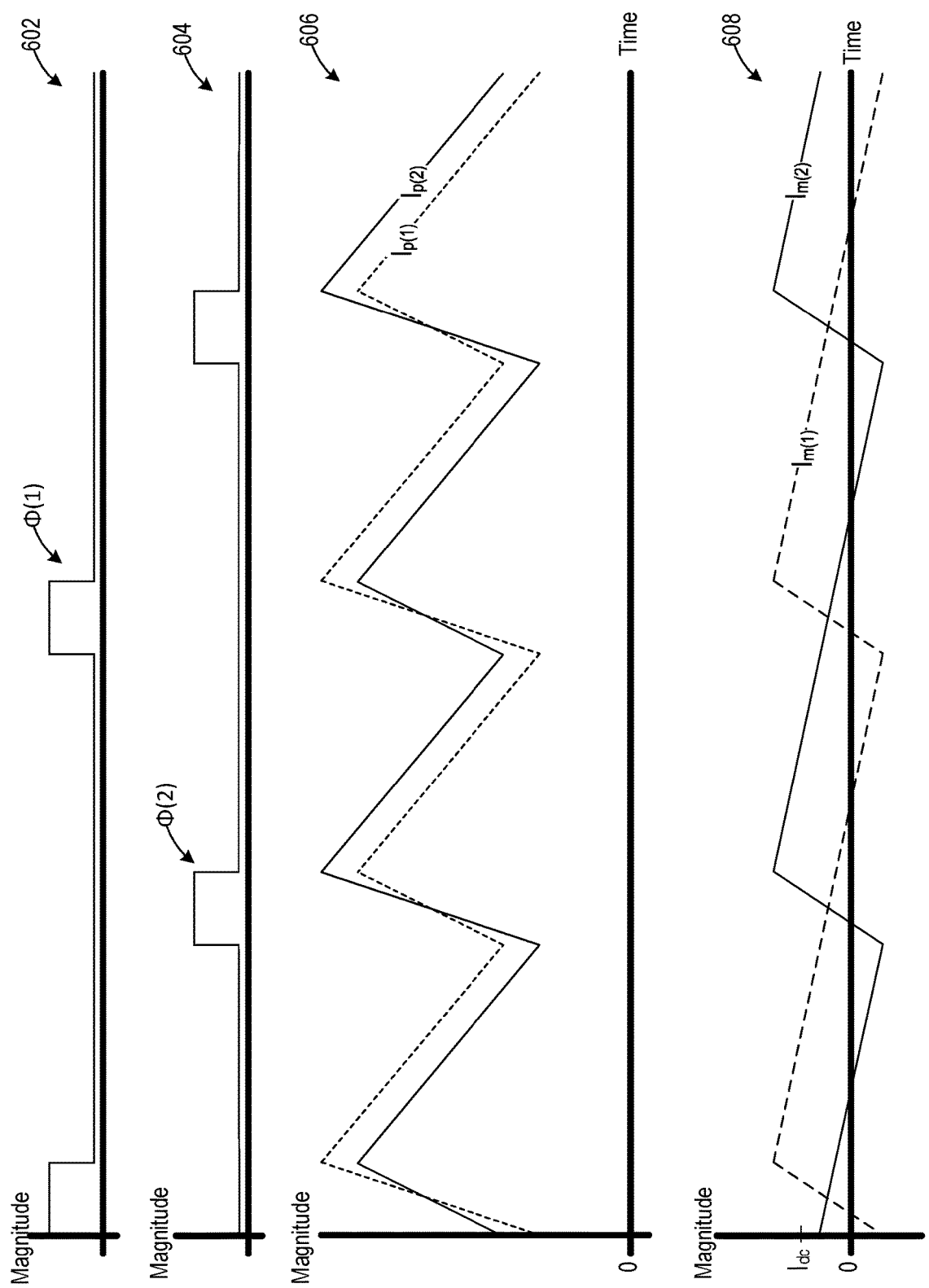
FIG. 6 includes four graphs illustrating an example of operation of the FIG. 3 switching power converter.

FIG. 6 includes graph 602, 604, 606, and 608 collectively illustrating one example of operation of switching power converter 300. The horizontal axis of each graph represents time, and the vertical axis of each graph represents magnitude. All graphs of FIG. 6 have a common time base. Graph 602 includes a curve representing control signal $\phi(1)$, and graph 604 includes a curve representing control signal $\phi(2)$. Although FIG. 6 illustrates control signals $\phi(1)$ and $\phi(2)$ being asserted when in a logic-high state, controls signals $\phi(1)$ and $\phi(2)$ could have a different polarity without departing from the scope hereof. As evident from graphs 602 and 604, control signals $\phi(1)$ and $\phi(2)$ are asserted out of phase with respect to each other. Control signals $\phi'(1)$ and $\phi'(2)$ are not shown in FIG. 6, but in some embodiments, control signals $\phi'(1)$ and $\phi'(2)$ are complementary to control signals $\phi(1)$ and $\phi(2)$, respectively, with the exception of optional deadtime between switching states, to prevent shoot-through.

Graph 606 includes curves representing phase currents $I_{p(1)}$ and $I_{p(2)}$ flowing out of the secondary sides of transformers 302(1) and 302(2), respectively, and graph 608 includes curves representing magnetizing current $I_{m(1)}$ and $I_{m(2)}$ of transformers 302(1) and 302(2), respectively. As can be appreciated when comparing graph 608 to graph 202 of FIG. 2, flux correction current source 310 significantly the reduces DC component Idc of respective magnetizing currents $I_{m(1)}$ and $I_{m(2)}$ of transformers 302(1) and 302(2), which indicates that net magnetic flux in magnetic cores 114(1) and 114(2) is relatively small, thereby enabling magnetic cores 316 to be relatively small.

Figure 7:
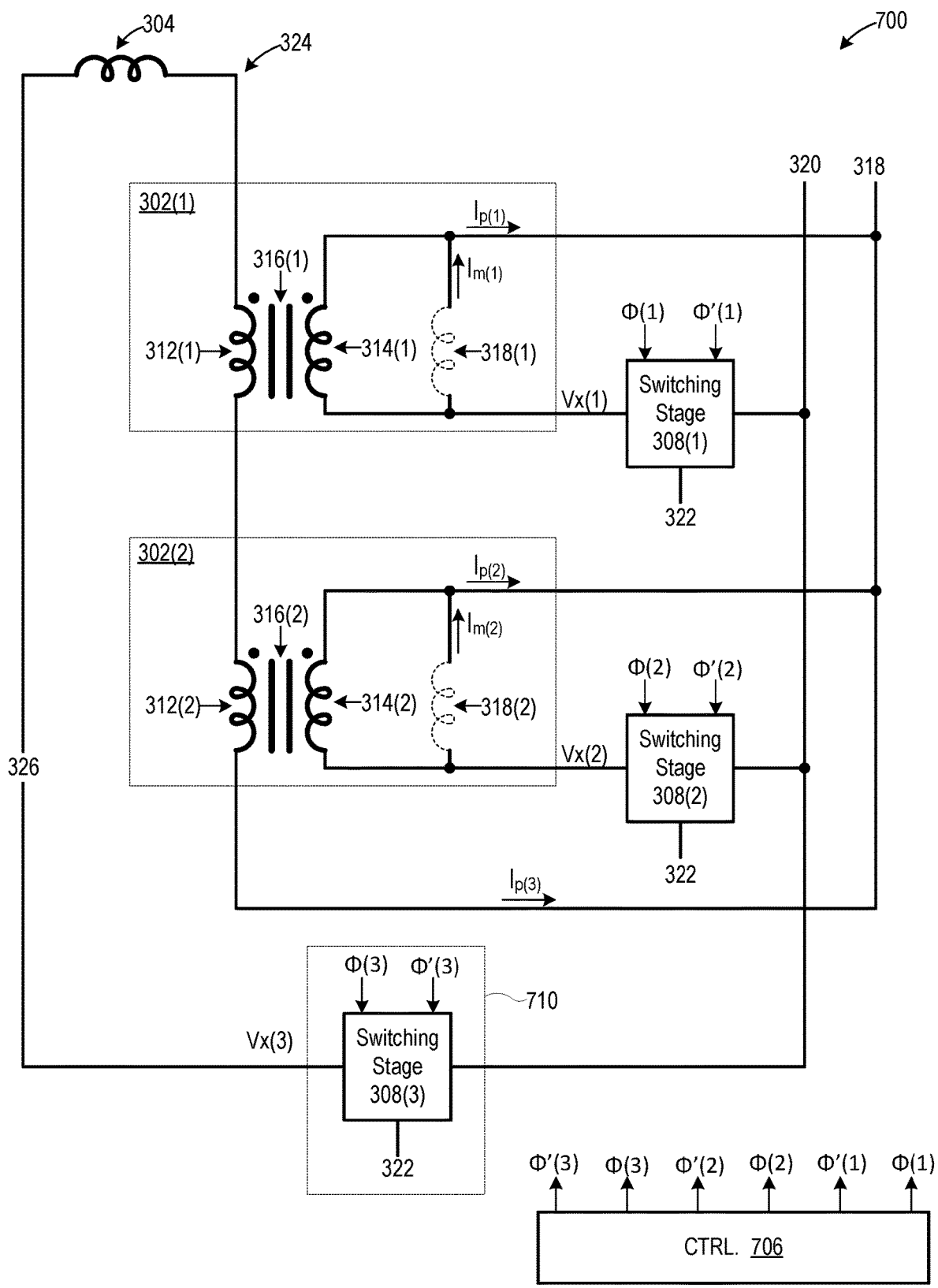
FIG. 7 is a schematic diagram of an embodiment of the FIG. 3 flux-corrected switching power converter where a flux correction current source includes a switching stage.

FIG. 7 is a schematic diagram of a new flux-corrected switching power converter 700, which is an embodiment of flux-corrected switching power converters 300 where flux correction current source 310 is embodied by a flux correction current source 710 including a switching stage 308 instance, i.e. switching stage 308(3). Switching stage 308(3) has the same configuration as each of switching stages 308(1) and 308(2), although switching stage 308(3) is sometimes referred to herein as compensation switching stage 308(3). Compensation switching stage 308(3) is electrically coupled in series with primary windings 312 and tuning inductor 304. Additionally, compensation switching stage 308(3) is electrically coupled to power node 320 and reference node 322. It should be appreciated that although flux-corrected switching power converter 700 includes three phases (switching stage 308(3) and inductance of circuit 324 collectively form a third phase), the switching power converter advantageously only requires two transformers 302, thereby promoting small size and low cost of the switching power converter.

Controller 706 is further configured to generate control signals $\phi(3)$ and $\phi'(3)$, in addition to control signals $\phi(1)$, $\phi'(1)$, $\phi(2)$, and $\phi'(2)$. Control signals $\phi(3)$ and $\phi'(3)$ are analogous to control signals $\phi(1)$, $\phi'(1)$, $\phi(2)$, and $\phi'(2)$, although controller 706 is configured to generate control signals $\phi(3)$ and $\phi'(3)$ such that switching stage 308(3) switches out of phase with each of switching stages 308(1) and 308(2). Accordingly, switching power converter 300 advantageously enables a common control scheme to be used for both (a) phases including transformers 302 and (b) the phase including flux correction current source 710. In some embodiments, controller 706 is configured to generate control signals $\phi(1)$, $\phi'(1)$, $\phi(2)$, $0'(2)$, $\phi(3)$, and $\phi'(3)$ such that adjacent switching stage 308 are phase offset by 120 degrees.

Figure 8:
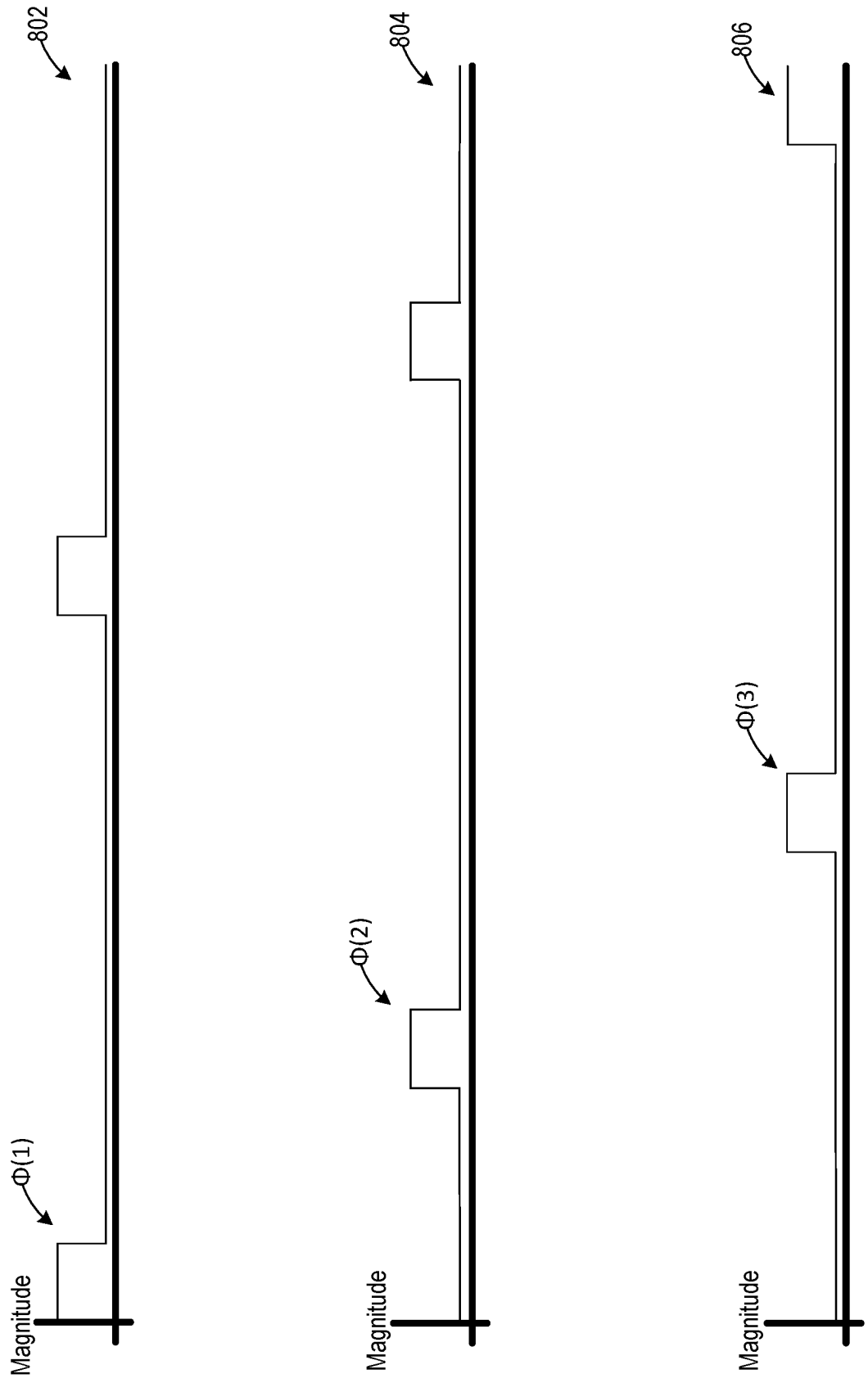
FIG. 8 includes three graphs, and FIG. 9 includes two graphs, collectively illustrating an example of operation of the FIG. 7 switching power converter.
Figure 9:
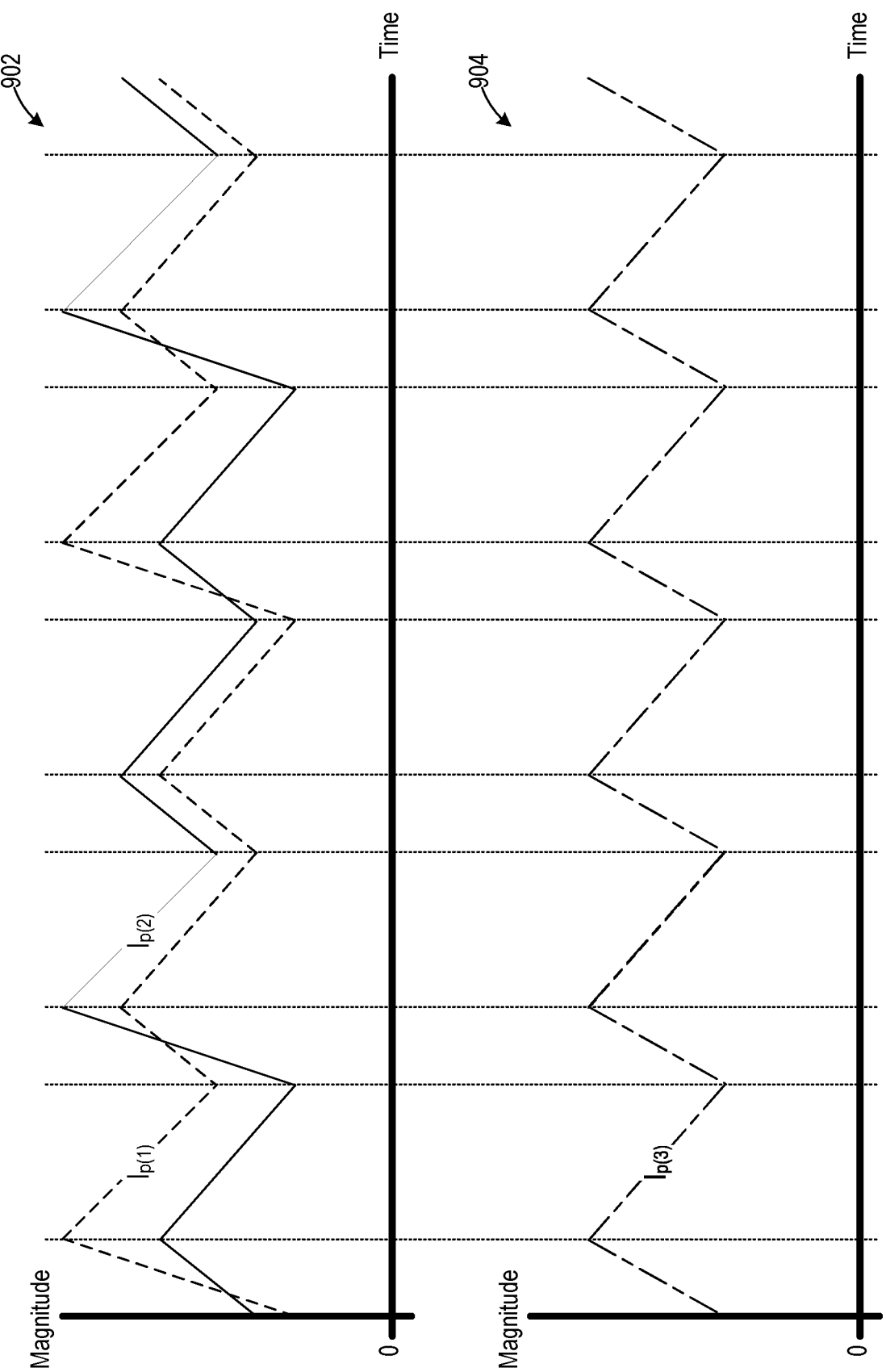

FIG. 8 includes graphs 802-806, and FIG. 9 includes graphs 902 and 904, collectively illustrating an example of operation of the FIG. 7 switching power converter. The horizontal axis of each graph represents time, and the vertical axis of each graph represents magnitude. All graphs of FIGS. 8 and 9 have a common time base. Graph 802 includes a curve representing control signal $\phi(1)$, graph 804 includes a curve representing control signal $\phi(2)$, and graph 806 includes a curve representing control signal $\phi(3)$. Although FIG. 8 illustrates control signals $\phi(1)$, $\phi(2)$, and φ(3) being asserted when in a logic-high state, controls signals φ(1), φ(2), and φ(3) could have a different polarity without departing from the scope hereof. As evident from graphs 802-806, control signals φ(1), φ(2), and φ(3) are asserted out of phase with respect to each other. Control signals φ'(1), φ'(2), and φ'(3) are not shown in FIG. 8, but in some embodiments, control signals φ'(1), φ'(2), and φ'(3) are complementary to control signals φ(1), φ(2), and φ(3), respectively, with the exception of optional deadtime between switching states, to prevent shoot-through.

Graph 902 includes curves representing phase currents $I_{p(1)}$ and $I_{p(2)}$ flowing out of the secondary sides of transformers 302(1) and 302(2), respectively, and graph 904 includes a curve representing phase current $I_{p(3)}$ flowing through transformer primary windings 312. FIG. 9 further includes vertical dotted lines connecting graphs 902 and 904, to assist a viewer in comparing the two graphs. Each vertical dotted line represents a common time in each of graphs 902 and 904. As evident from graphs 902 and 904, all phase currents $I_{p(1)}$ through $I_{p(3)}$ have approximately similar shapes and magnitudes, but are shifted in phase with respect to each other.

Figure 10:
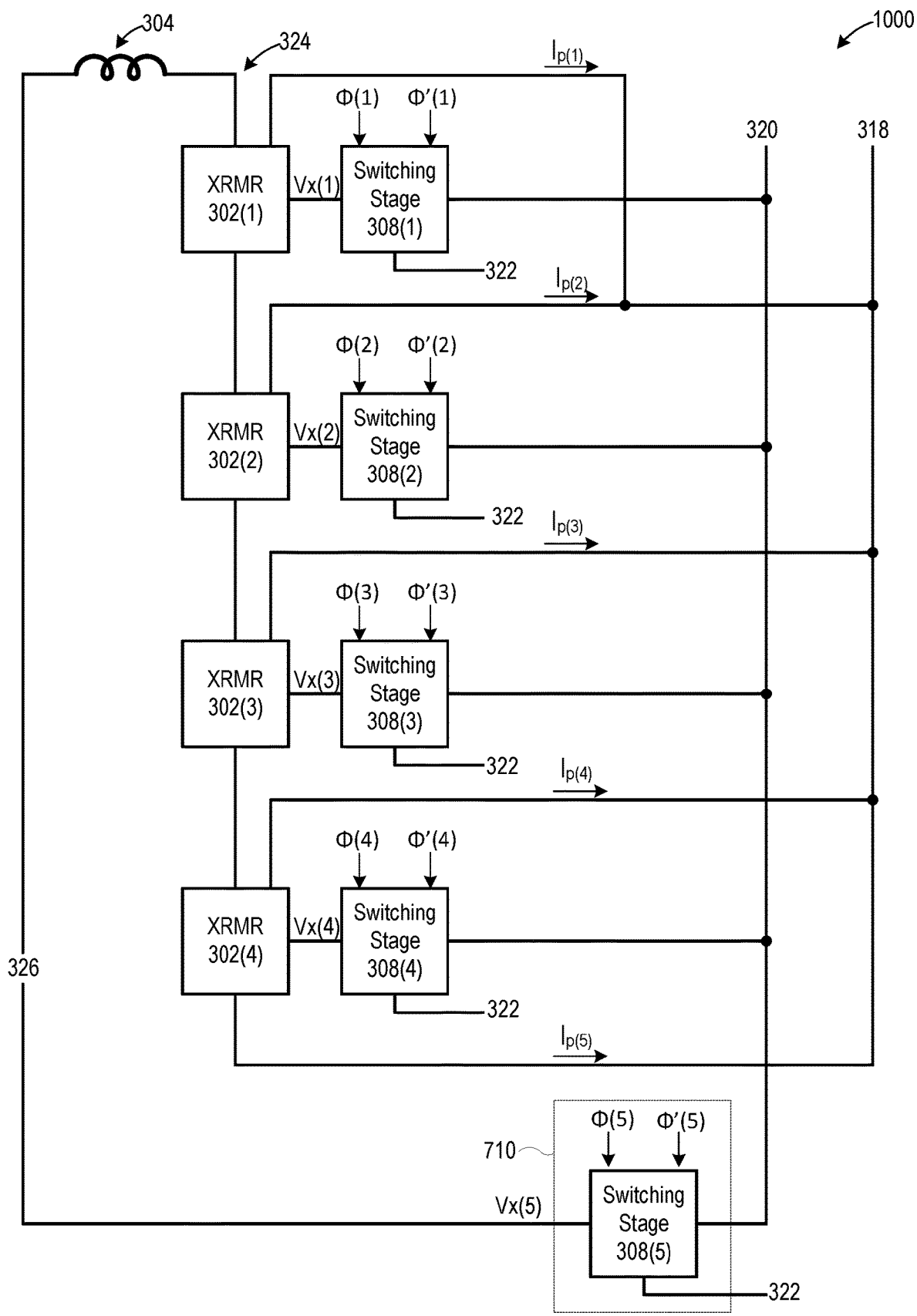
FIG. 10 is a schematic diagram of an embodiment of the FIG. 7 flux-corrected switching power converter including five phases.
Figure 11:
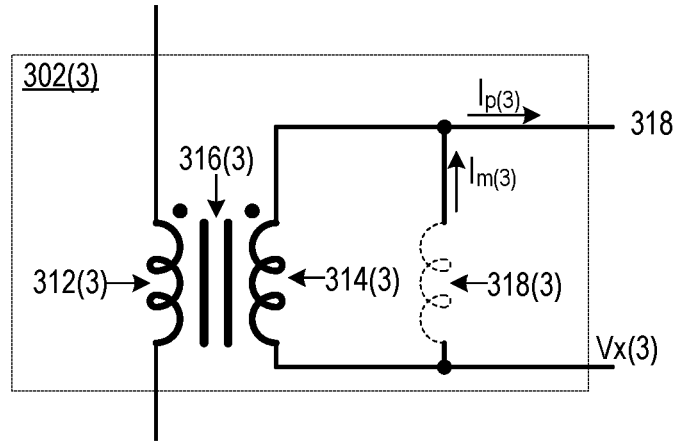
FIG. 11 is a schematic diagram of a transformer of the FIG. 10 flux-corrected switching power converter.
Figure 12:
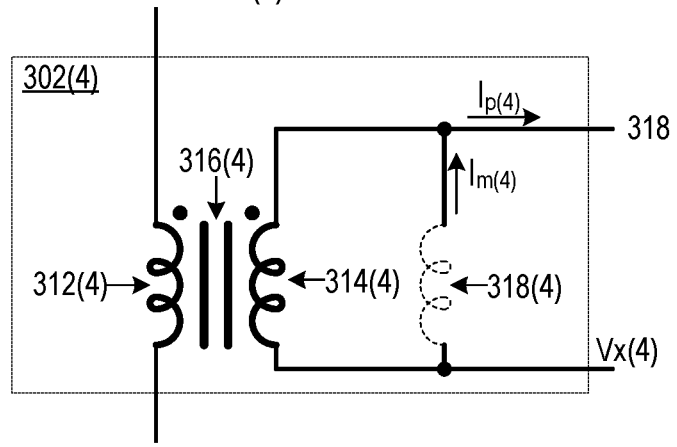
FIG. 12 is a schematic diagram of another transformer of the FIG. 10 flux-corrected switching power converter FIG. 13 includes five graphs, and FIG. 14 includes two graphs, collectively illustrating an example of operation of the FIG. 10 switching power converter.

As mentioned above, the number of transformers and associated switching stages in the flux-corrected switching power converters may vary, as long as each switching power converter includes at least one transformer. For example, FIG. 10 is a schematic diagram of a flux-corrected switching power converter 1000, which is an embodiment of the FIG. 7 flux-corrected switching power converter including four transformers 308 and having five phases. For illustrative clarity, controller 706 and details of transformers 302 are not shown. However, transformers 302(1) and 302(2) have the same configuration as in FIG. 7, and FIGS. 11 and 12 are schematic diagrams of transformers 302(3) and 302(4), respectively. In one embodiment, controller 706 is configured to generate control signals φ and φ' such that switching stages 308(1)-308(5) switch out of phase with each other, e.g. adjacent switching stages 308 are phase offset by 72 degrees.

Figure 13:
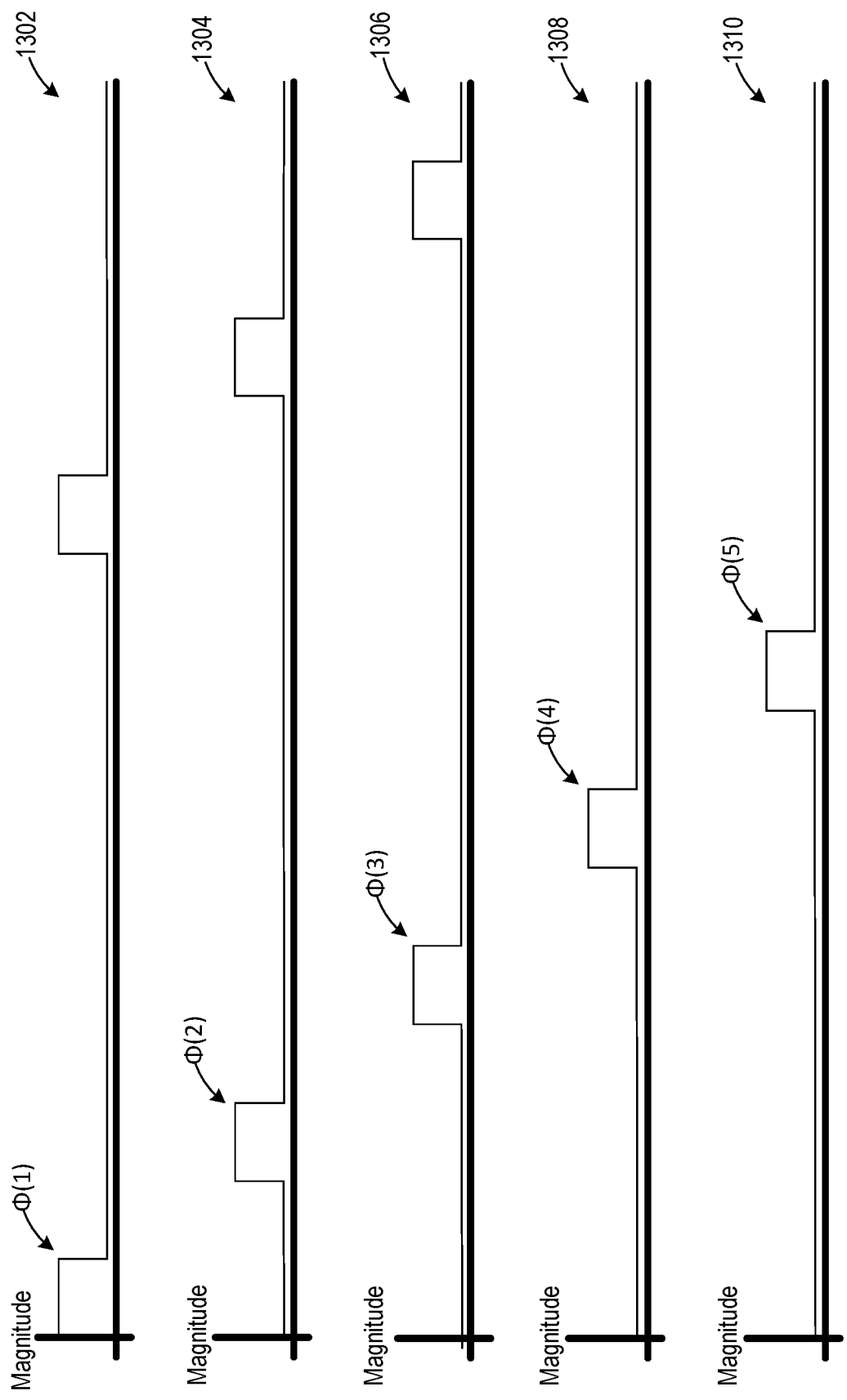
Figure 14:
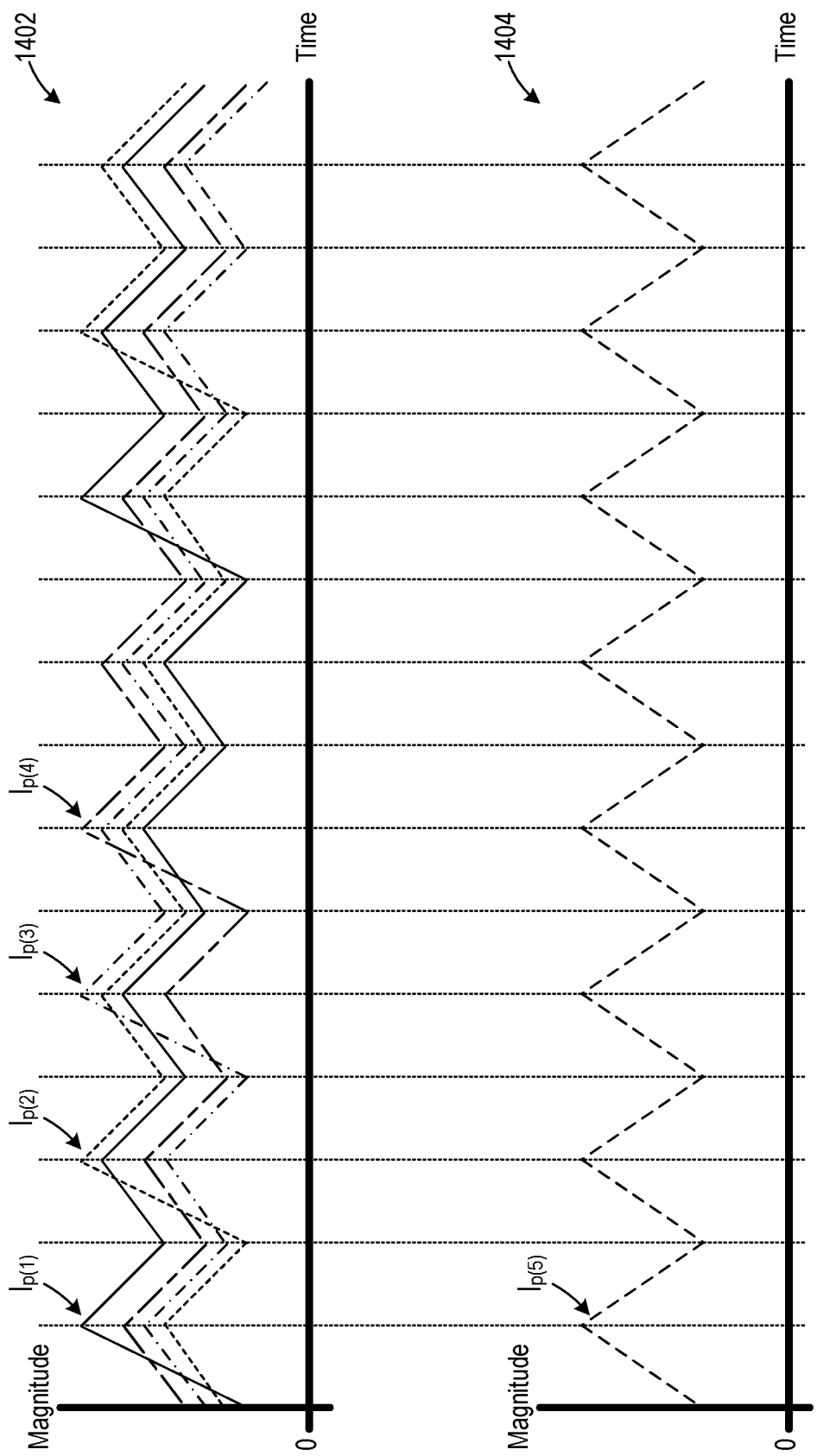

FIG. 13 includes graphs 1302-1310, and FIG. 14 includes graphs 1402 and 1404, collectively illustrating an example of operation of the FIG. 10 switching power converter. The horizontal axis of each graph represents time, and the vertical axis of each graph represents magnitude. All graphs of FIGS. 13 and 14 have a common time base. Graph 1302 includes a curve representing control signal φ(1), graph 1304 includes a curve representing control signal φ(2), graph 1306 includes a curve representing control signal φ(3), graph 1308 includes a curve representing control signal φ(4), and graph 1310 includes a curve representing control signal φ(5). Although FIG. 13 illustrates control signals φ(1), φ(2), φ(3), φ(4), and φ(5) being asserted when in a logic-high state, controls signals φ(1), φ(2), φ(3), φ(4), and φ(5) could have a different polarity without departing from the scope hereof. As evident from graphs 1302-1310, control signals φ(1), φ(2), φ(3), φ(4), and φ(5) are asserted out of phase with respect to each other. Control signals φ'(1), φ'(2), φ'(3), φ'(4), and φ'(5) are not shown in FIG. 13, but in some embodiments, control signals φ'(1), φ'(2), φ'(3), φ'(4), and φ'(5) are complementary to control signals φ(1), φ(2), φ(3), φ(4), and φ(5), respectively, with the exception of optional deadtime between switching states, to prevent shoot-through.

Graph 1402 includes curves representing phase currents $I_{p(1)}$, $I_{p(2)}$, $I_{ph(3)}$, and $I_{ph(4)}$ flowing out of the secondary sides of transformers 302(1) through 302(4), respectively, and graph 1404 includes a curve representing phase current $I_{p(5)}$ flowing through transformer primary windings 312. FIG. 14 further includes vertical dotted lines connecting graphs 1402 and 1404, to assist a viewer in comparing the two graphs. Each vertical dotted line represents a common time in each of graphs 1402 and 1404. As evident from graphs 1402 and 1404, all phase currents $I_{p(1)}$ through $I_{p(5)}$ have approximately similar shapes and magnitudes, but are shifted in phase with respect to each other.

Changes may be made in the above switching power converters and associated methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A flux-corrected switching power converter, comprising:
   a first transformer including a first magnetic core, a first primary winding, and a first secondary winding;
   a first switching stage electrically coupled to the first secondary winding;
   a compensation switching stage electrically coupled to the first primary winding; and
   a controller that controls the compensation switching stage as a flux correcting current source by switching of at least the first switching stage.

2. The flux-corrected switching power converter of claim 1, wherein the controller is configured to control switching of the compensation switching stage such that the compensation switching stage switches out of phase with respect to the first switching stage.

3. The flux-corrected switching power converter of claim 1, further comprising a tuning inductor electrically coupled to the first primary winding.

4. The flux-corrected switching power converter of claim 1, further comprising:
   a second transformer including a second magnetic core, a second primary winding, and a second secondary winding; and
   a second switching stage electrically coupled to the second secondary winding;
   wherein the first and second primary windings are electrically coupled in series.

5. The flux-corrected switching power converter of claim 4, wherein the controller is configured to control switching of the second switching stage such that the second switching stage switches out of phase with respect to the first switching stage and the compensation switching stage.

6. The flux-corrected switching power converter of claim 5, wherein:
   the first secondary winding is electrically coupled between the first switching stage and a first power node; and
   the second secondary winding is electrically coupled between the second switching stage and the first power node.

7. The flux-corrected switching power converter of claim 6, wherein the first power node is an output power node.

8. The flux corrected switching power converter of claim 6, wherein the first power node is an input power node.

9. The flux corrected switching power converter of claim 6, further comprising:
   a third transformer including a third magnetic core, a third primary winding, and a third secondary winding; and a third switching stage electrically coupled to the third secondary winding;

wherein the first, second, and third primary windings are electrically coupled in series.

10. The flux-corrected switching power converter of claim 9, wherein the controller is configured to control switching of the third switching stage such that the third switching stage switches out of phase with respect to each of the first switching stage, the second switching stage and the compensation switching stage.

11. The flux-corrected switching power converter of claim 10, further comprising:
- a fourth transformer including a fourth magnetic core, a fourth primary winding, and a fourth secondary winding; and
- a fourth switching stage electrically coupled to the fourth secondary winding;
- wherein the first, second, third, and fourth primary windings are electrically coupled in series.

12. The flux corrected switching power converter of claim 11, wherein the controller is further configured to control switching of the fourth switching stage such that the fourth switching stage switches out of phase with respect to each of the first, second, and third switching stage switches and the compensation switching stage stages.

13. A flux-corrected switching power converter, comprising:
- a plurality of transformers, each of the transformers including a primary winding and a secondary winding; each primary and secondary winding electrically coupled with a respective switching stage,
- a tuning inductor electrically coupled in series with primary windings of the plurality of transformers, and
- a controller that controls switching of each switching stage.

14. The flux-corrected switching power converter of claim 13, wherein the controller is further configured to control switching of each switching stage such that each switching stage switches out of phase with respect to each other switching stage.

15. The flux-corrected switching power converter of claim 13, wherein each secondary winding electrically couples between its respective switching stage and a power node.

16. The flux corrected switching power converter of claim 15, wherein the primary winding of one of the plurality of transformers electrically couples to the power node.

17. The flux corrected switching power converter of claim 16, wherein the primary windings electrically couple in series between the power node and a reference node.

18. The flux corrected switching power converter of claim 17, wherein the power node is an output power node of the flux-corrected switching power converter.

19. The flux corrected switching power converter of claim 18, wherein the power node is an input power node of the flux corrected switching power converter.

* * * * *